UNITED STATES PATENT OFFICE.

CHARLES M. ELY, OF LEXINGTON, KENTUCKY, ASSIGNOR TO W. CASSIUS GOODLOE, OF SAME PLACE.

VARNISH.

SPECIFICATION forming part of Letters Patent No. 289,766, dated December 4, 1883.

Application filed July 13, 1883. (No specimens.)

*To all whom it may concern:*

Be it known that I, CHARLES M. ELY, a citizen of the United States, and a resident of Lexington, in the county of Fayette and State of Kentucky, have invented certain new and useful Improvements in Compounds for Varnishes, of which the following is a specification.

My invention relates to a compound for varnishes; and it consists in the combination of various ingredients, which will be fully set forth in the following description.

I use the following ingredients, which are preferably combined in the proportions stated, viz: ordinary carriage-varnish, one gallon; india-rubber, one and one-half ounce; raw linseed-oil, two ounces; neat's-foot oil, one ounce; gum-arabic, one and one-half ounce; English ivory drop-black, one and one-half pound. Of these ingredients the following parts are prepared before mingling with the others in the following manner: The india-rubber is first dissolved by slow heat in one pint of turpentine. The gum-arabic is dissolved in water, and the English ivory drop-black ground in japan. All the ingredients are then thoroughly mixed by agitation, and heated, but not boiled. The mixture is then cooled, ready for use. This varnish is particularly adapted for use on leather used on carriages.

I am aware that water-proof blacking for leather has been composed of gum-arabic, castor or neat's-foot oil, shellac, ammonia, lampblack, solutions of india-rubber and resin, and an aqueous solution of borax; but such is not my invention.

What I claim is—

A varnish compound consisting of ordinary carriage-varnish, india-rubber, raw linseed-oil, neat's-foot oil, gum-arabic dissolved by water, and English ivory drop-black ground in japan, all combined in about the proportions and in the manner set forth.

In testimony whereof I have hereunto set my hand.

CHARLES M. ELY.

Witnesses:
 WM. CASSIUS GOODLOE,
 G. E. BILLINGSLEY.